Sept. 1, 1936.   P. DUNSHEATH   2,052,923
ELECTRIC CABLE
Original Filed April 21, 1933    4 Sheets-Sheet 1

INVENTOR
Percy Dunsheath
BY Byrnes, Stebbins & Blenko
his ATTORNEYS

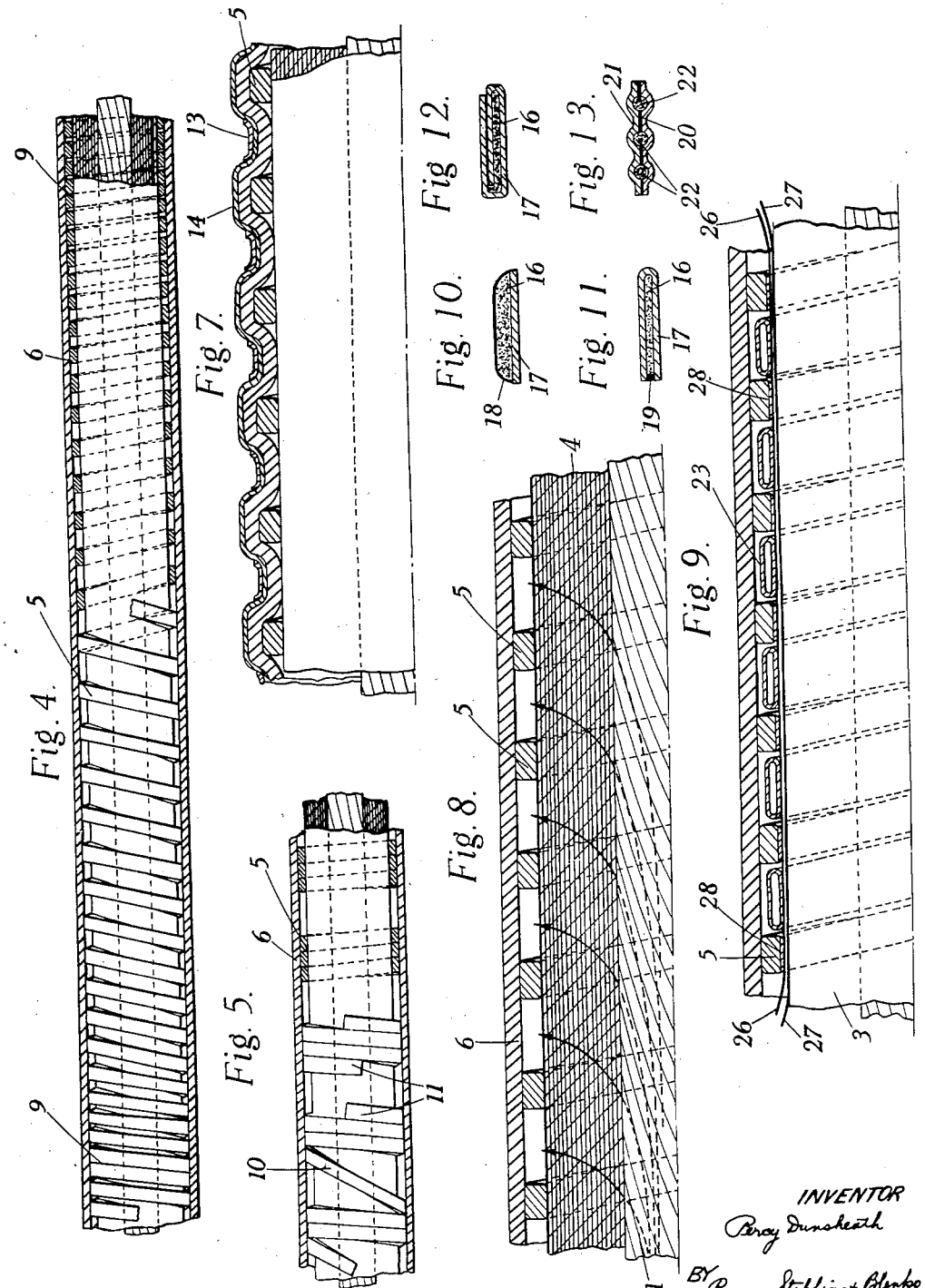

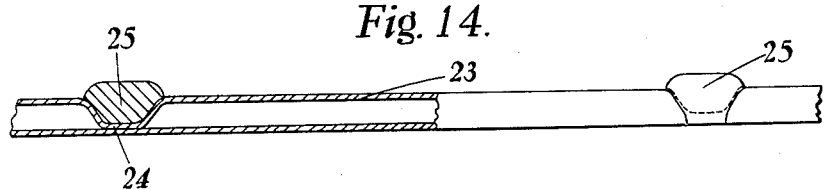
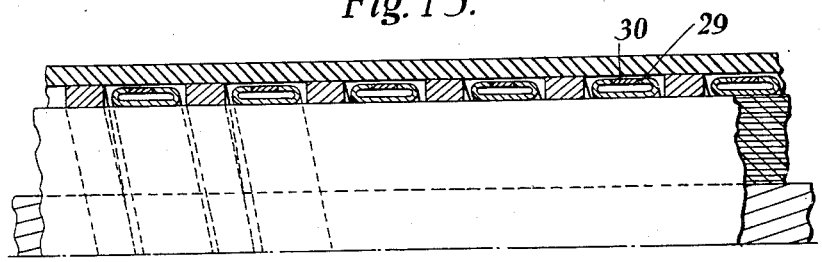
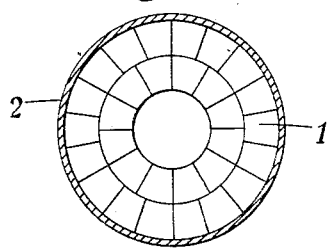
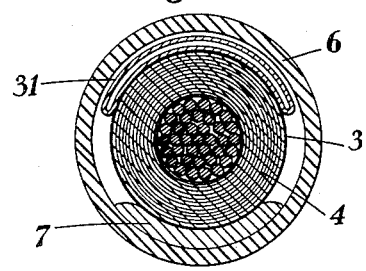
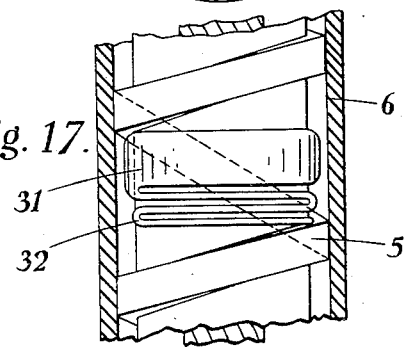
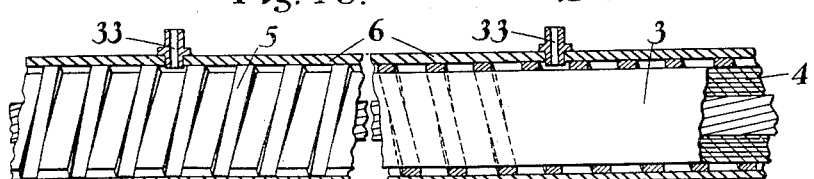

Sept. 1, 1936.   P. DUNSHEATH   2,052,923
ELECTRIC CABLE
Original Filed April 21, 1933   4 Sheets-Sheet 4

INVENTOR
Percy Dunsheath
BY
Stebbins, Blenko & Parmelee
ATTORNEYS

Patented Sept. 1, 1936

2,052,923

UNITED STATES PATENT OFFICE 2,052,923

ELECTRIC CABLE

Percy Dunsheath, Kent, England, assignor to W. T. Henley's Telegraph Works Company Limited, London, England, a British company Original application April 21, 1933, Serial No. 667,207. Divided and this application June 19, 1934, Serial No. 731,288. In Great Britain April 27, 1932

11 Claims. (Cl. 173—244)

This invention relates to electric cables of the kind in which the dielectric is formed by superposed layers of paper built up to the required thickness and impregnated with an appropriate liquid or semi-liquid material hereafter spoken of as compound.

The compound with which such cables are impregnated is usually viscous at normal temperatures but becomes more fluid as the cable warms up. It is held within the structure of the paper itself, on the surfaces of the layers and between these layers, mainly by surface tension. But, since it has a co-efficient of expansion under heat materially greater than the materials with which it is associated in the cable, relative displacement between the compound and the paper is forced to take place, as the cable changes temperature. This favors the production of spaces within the dielectric free of compound and containing gas and, under certain circumstances, the gas in such spaces may be reduced to a low pressure favorable to ionization and electric discharge in the spaces. The production of such spaces is facilitated by the existence of minute quantities of gas either in the form of bubbles or in solution in the compound which, when the latter becomes hot, are liberated and form larger bubbles. An opposite action, tending to the disappearances of the spaces, does not take place when the compound cools down since the mechanism of the process is not reversed. The heating takes place from the conductor outwards through the dielectric. The cooling takes place from the outside of the dielectric towards the conductor. The compound which has been caused to migrate outwards by the heat is subsequently cooled and rendered viscous before it has returned so that its return is retarded and may not completely take place. These conditions are also influenced by the fact that the lead sheath possesses small elasticity so that it may be permanently distended by the expansion of the compound.

It has been recognized that the disadvantageous effects indicated in the preceding paragraph can be counteracted by the continuous application of elastic pressure, by means of compressed gas, to the dielectric and a number of proposals have been made for embodying this principle of operation in a cable installation. These proposals have included the application of pressure, both on the outside of the lead sheath and within that sheath. In the latter type of arrangement the gas has either been enclosed in containers or has been in direct contact with the dielectric. In the latter variety, the gas has been distributed in relatively small spaces within the dielectric itself and has accordingly been subjected to electric stress and, in addition, the possibility of the occurrence of a serious reduction of pressure throughout the cable when the enclosing sheath is cut through or pierced at some point has been present.

In cables constructed in accordance with the present invention the compressed gas is provided in direct contact with the dielectric in spaces which are of relatively short longitudinal extent and are screened from electric stress. The means by which the longitudinal extent of the spaces is limited is such that movement of the gas along the cable is rendered practically impossible or reduced to a small value so that when the sheath is cut, for instance, when making a joint, loss of gas pressure does not readily take place. The barriers to movement are also such that they may readily be reinforced in their effect locally, when the enclosing sheath has to be opened.

The result of this arrangement is that the manufacture of the cable can be completed at the works and the cable may be treated, in transport and in installation, very much as an ordinary cable. It also has the advantage that it permits of constructing the cable in such a way that the good dielectric and heat dissipating properties of mass-filled cables are retained. By mass-filled cables is intended that type in which the interstices within the paper lappings are filled as completely as possible with compound.

When a cable provided with compressed gas enclosed within its sheath is in service the gas forms cushions for accommodating the expansion and contraction of the compound, thereby ensuring that at all times the dielectric material is maintained under compression so as to avoid ionization and to ensure the existence of good electrical conditions within the dielectric.

It will be understood that in general reinforcement of the sheath enclosing the dielectric and the gas cushions, will be necessary.

The gas cushions of the present invention are to be distinguished from bubbles of gas which may accidentally occur between layers forming the dielectric or between the dielectric and the conductor or between the dielectric and the sheath. In the present case the gas cushions form an appreciable proportion of the volume enclosed by the sheath of the cable with the object that they may maintain on the dielectric a pressure which is high and which does not vary through too great a range under the influence of the temperature changes and the accompanying volume changes which take place within the cable under working conditions. For this purpose it is necessary to make definite provision for the gas cushions in the structure of the cable and in its method of manufacture. It will be seen from the following description that, in the production of the gas cushions, use may be made of a material, such as viscous cable compound, which by rise of temperature may be made to flow, but it will also be seen that the spaces for the gas cushions are bounded mainly by permanently solid material and that at least part of the wall of each gas cushion space is formed of permanently solid dielectric material. By "permanently solid material" it is intended to indicate material which remains solid after it has been initially embodied in the structure of the cable.

As the result of the definite location of gas bodies by the method of constructing the cable in accordance with the invention, it follows that the cushioning effect is distributed throughout the cable with a very close approach to uniformity. By this means, it is insured that the whole of the dielectric is continually under elastic compression so that the formation of a vacuous space at any point is avoided.

Gas cushions arranged in accordance with the invention are preferably placed outside the dielectric boundary, between it and the sheath. The dielectric may, for instance, be built up in the ordinary way and surrounded with a permeable conductive screen and then have applied to it spacers which support the sheath at a distance radially from the dielectric so as to provide spaces for the cushions of gas. The spacers may also serve as partitions or as parts of partitions to divide up the gas space into short lengths so as to prevent movement of the gas along the cable. In the case of multicore cables the cushion may be wholly or partly formed in the spaces between the dielectric of the several cores. The spacers will be formed of material which is a relatively good conductor of heat and if this material is not electrically conductive, it is preferably enclosed in a conductive covering so as to establish electrical equilibrium between the conductive coverings of the cores and the sheath and prevent the existence of any electrical stresses in the gas cushion spaces.

In speaking of the relatively short longitudinal extent of the gas cushions it is intended to indicate that the dimensions of these cushions parallel with the axis of the cable are small in comparison with any length in which the cable is likely to be used in practice. This ensures that there are always a large number of separating barriers between the cushions in a cut length of cable. Accordingly if any defect occurs in the sheath or if the end of the cable is temporarily opened, loss of pressure, if it occurs, can only take place slowly.

This application is a division of my co-pending application Serial No. 667,207, filed 21st April 1933, for Electric cables. In the said co-pending application the construction of the cable itself is dealt with. The present application deals with the method of manufacture of the cable.

The invention will be further described by the aid of the accompanying drawings. In these Figures 1 and 2 show longitudinal views of single core cables, the lead sheath and other parts being in section.

Figures 4 and 5 show views similar to Figure 1 of alternative forms of a single core cable.

Figures 6, 7, 8 and 9 show, partly in longitudinal section, views of single core cable construction, the upper half only being included.

Figures 10, 11, 12 and 13 show details in transverse section.

Figure 14 shows a detail partly in longitudinal section of means for applying the gas under pressure to the cushions.

Figure 15 shows, partly in longitudinal section, a single core cable, including only the upper half.

Figure 16 shows a transverse section.

Figure 17 a plan view with part of the lead sheath removed of a further means of applying the gas under pressure to the cushions.

Figure 18 shows a single core cable partly in longitudinal section.

Figure 19:
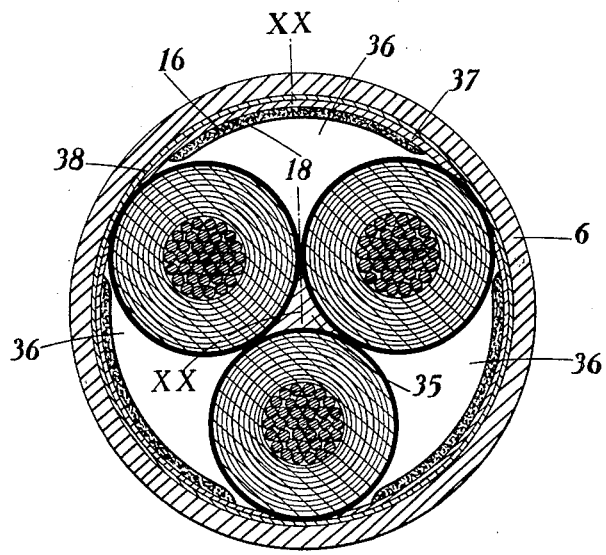

Figure 19 shows a 3-core cable, in transverse section.

Figure 20:
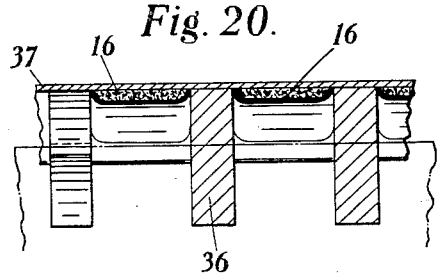

Figure 20 shows, in longitudinal section on the line XX—XX, the strip carrying the spacer members.

Figure 21:
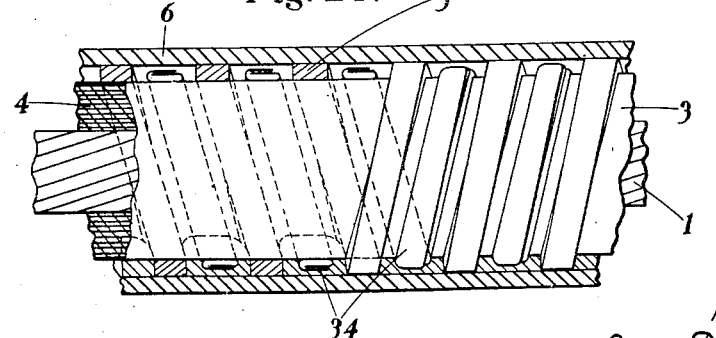

Figure 21 shows, partly in longitudinal section, a single core cable, and

Figure 22 shows a transverse section of a conductor which may be embodied in the cable.

In the manufacture of a cable embodying the invention the preliminary stages will, in general, follow the usual course. The conductor may be of the usual form, that is, built up of circular wire stranded together, or it may be made so as to avoid including an appreciable space within which compound may collect. In the latter case the desired result may be obtained by taking wires of segmental form laid round the circular centre, as shown in Figure 22, or by filling the spaces between the round copper wires with soft metal or other filling material which will not hold an appreciable quantity of compound. In addition, or alternatively, the conductor may have applied to it a tightly fitting wrapping of some material such as oil silk (shown at 2 in Figure 22) which is impervious to the compound. The dielectric will be lapped on the conductor in the usual way and provided with a conductive covering, for instance, metallized paper or metal foil. This is indicated by 3 in the accompanying drawings in which also the dielectric is indicated by 4.

Figure 1:
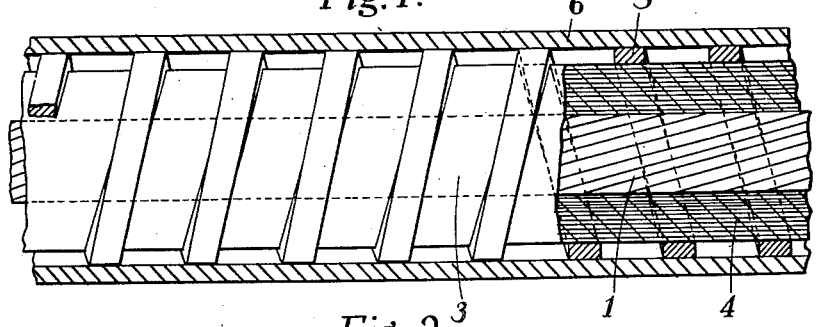

The invention is applicable both to single core and to multicore cables. Examples will first be discussed of the single core case. In this the spacer can conveniently be applied by the helical lapping of a strip. For instance, as shown in Figure 1 a spacing strip 5, either of paper or other fibrous material with a metallized coating, or of metal, may be taken and lapped on over the conducting layer 3 on the insulated core, in an open helix, so as to provide spaces for the gas cushions between the turns of the helix. The application of the sheath 6 over the spacing strip completes a cable structure. The production of the state of gaseous pressure in the spaces provided will follow by means to be hereafter described. Dimensions for a spacer, such as indicated in Figure 1, might be .1" thick radially (2.5 mm.) and .25" wide (6.3 mm.) lapped on with a clear space of .5" (12.6 mm.) between turns.

Figure 2:
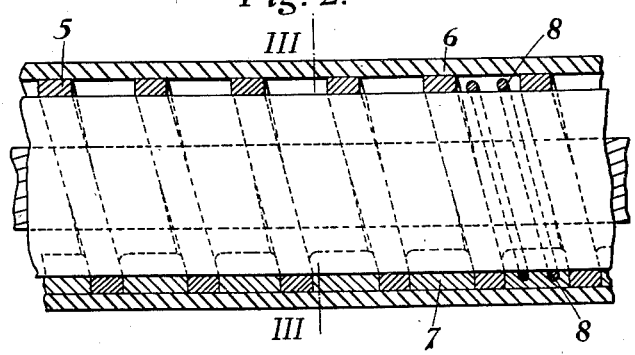
Figure 3:
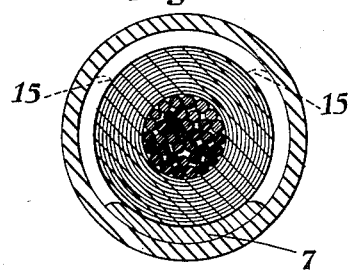
Figure 3 shows a transverse section on line III—III of Figure 2.

The division of the helical gas space, thus provided, into separate compartments may be carried out by providing pools of compound at the bottom of each convolution to form a seal between the space in this convolution and that in the next. This is indicated in Figures 2 and 3 where the pool of compound is shown at 7. The compound under working conditions will be highly viscous or practically solid so that it will not readily be displaced by any pressure difference which may exist between adjacent gas cushions. To make such displacement still more difficult, strings as shown at 8 in Figure 2 may be lapped round the core so as to give additional surface for the compound to adhere to. It will be seen from the description which follows that in general the methods of construction are such that approximately equal pressures will exist on both sides of these sealing pools under normal conditions.

In an alternative type of construction, illustrated in Figures 4 and 5, the helical spacing strip 5 may be applied with variable pitch, two or more turns of close pitch being followed by a turn or a portion of a turn or a number of turns of open pitch. In Figure 4 the close turns are shown at 9 and it is seen that in this arrangement there are a large number of open turns between the points at which the close turns are located. In this arrangement, reliance can be placed on the close turns to shut off one compressed gas cushion from another, but in general, especially where a high pressure is used, it is preferable to treat these close turns as supplementing the action of sealing pools such as shown in Figures 2 and 3. There are then a number of cushions each occupying part of the space between two adjacent turns and all separated by sealing pools of compound and at intervals there are close turns 9 which provide an additional barrier to the lengthwise movement of the gas.

In the arrangement shown in Figure 5 the spacing strip 5 is applied with three turns in close contact followed by half a turn extending over an appreciable axial length of core (say .5″). This is followed by three more turns, close coiled, and half a turn open-coiled, and so on. The length 10 forming the open half turn can be subsequently cut through or cut out and the two parts bent into contact with the close turns if desired, as shown at 11 in Figure 5.

Figure 6:
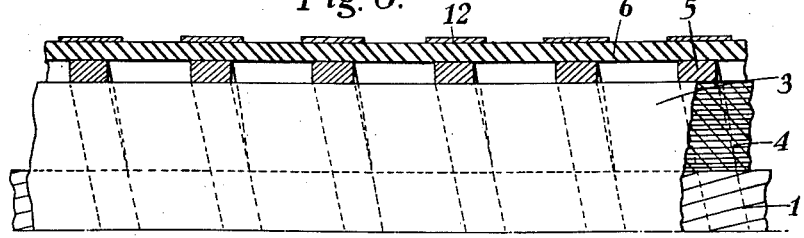

The spacing strip 5 will be a good fit between the conducting covering 3 of the core and the sheath 6 but it will generally be advantageous to make this fit more closely by the application of a binding strip such as 12, shown in Figure 6. This binding strip 12 will generally be made of a thin tape of metal of high tensile strength applied helically under considerable tension to the sheath directly over the spacing strip 5. By this means the sheath is compressed closely against this strip 5 and the latter is pressed against the outside of the core. This serves the double purpose of sealing the joints between the core and strip and the strip and sheath against the passage of gas and of making good electrical contact between the conducting covering 3 of the core, the surface of the spacing strip 5 and the surface of the sheath 6. The binding strip will also serve to reinforce the sheath and for this purpose it may advantageously be made of greater width than the spacing strip 5.

A number of methods of producing the desired state of gas under pressure in the spaces are available. Some of these will now be described. The compressed condition may be obtained by sheathing the cable with the spaces full of air or other gas at normal atmospheric pressure and the pressure may be raised subsequently by reducing the volume of the gas spaces. One way of producing this reduction is by local inward displacements of the sheath. The application of a method of this kind is illustrated in Figure 7. In this case, starting with a cable structure of the kind indicated in Figure 2, the reduction of the volumes of the gas spaces is brought about by applying helically a binder 13 of high tensile metal tape applied under a considerable tension to the outside of the sheath. This tape is preferably applied over a bedding 14 formed by a lapping of cotton tape. The metal tape is applied with the same pitch as the spacing strip 5 and compresses inward that portion which lies between the turns of the spacing strip. It will be seen that it also serves as a reinforcement for the sheath.

In another method the volume reduction may be brought about by forcing compound along the stranded conductor from one or both ends of a length of cable. In general both ends will be used but if one end only is made use of for the inflow of the compound it will be understood that it will be necessary to seal up the other end during the operation. This method of producing the compression is illustrated diagrammatically in Figure 8, where the arrows suggest the paths taken by the compound which enters by way of the interstices of the conductor 1, passes outward through the dielectric material 4 to the spaces between the spacing strips 5. The conductor will, of course, in such cases be formed with the necessary open structure and it will be advantageous to heat it by the passage of electric current so as to maintain fluidity of the compound during its movement along the cable. The compound forced in by this method will move outward radially from the surface of the conductor into the dielectric and displace compound before it radially outward to occupy a portion of the surrounding space. The extent of the filling of this space to obtain a suitable pressure is indicated by the dotted lines 15 in Figure 3 showing the level to which the compound will rise in each of the annular spaces.

Another method which may be employed for this volume reduction is the subjecting of the conductor and dielectric to supercooling after impregnation followed by immediate application of the spacing strip and covering with a lead sheath. The expansion of the compound, which subsequently takes place as it returns to normal temperature, will produce a reduction in the space available for the gas and thereby raise its pressure. The methods above indicated may be used with others subsequently to be described. Where the total compression is obtained by volume reduction it is preferable to arrange that the final volume should be only one-fifth to one-tenth of the original volume.

In a method of another type the increase in pressure can be obtained by evolution of gas within the cushion spaces. This may, for instance, be obtained by evolution from a solution. In one variety of this method a very cold compound is used which is supercharged with gas in solution, for instance, carbon dioxide. This compound may be used to impregnate the dielectric. It may be used also or alternatively for feeding into the gas space immediately prior to the application of the sheath. The application of heat has the effect of causing the evolution of gas so that in the normal temperature range of the cable the free gas exerts the desired pressure. In another method the gas may be applied to the cable adsorbed to a suitable material, for instance, finely divided carbon or silica gel. The adsorption may be assisted by dissolving the gas in a low boiling point solvent or it may be effected by the use of high pressure. In the latter case advantage is taken of the time lag, which occurs in the liberation of the gas, to apply the material to the cable and enclose the cable in a sheath. This material may be carried in or on a strip which may be appled simultaneously with the spacing strip between the turns thereof. Examples of the carrier strip are shown in Figures 10, 11, 12 and 13. In Figure 10 the adsorbing material 16 is supported on a flat tape 17 and is enclosed by a thin covering 18 of wax or cellulose composition or other material which will form a temporary closure to impede the evolution of the gas until the carrier strip has been applied to the core and the sheath has also been put into position. The enclosing material 18 may be loosened or driven off by the action of heat or by the solvent action of the compound in the cable. The removal of this enclosure will permit or facilitate the evolution of gas which may be assisted by heat or other means. In the form of carrier strip shown in Figure 11 the tape 17 is folded over to cover the adsorbent material 16 and wax or other sealing agent is applied at the edge 19. In the case of Figure 12 the tape 17 is wrapped completely over the adsorbent material 16. The overlap shown on the upper side may suffice to retain the gas, or additional sealing by wax may be employed. In Figure 13 the carrier tape is formed of upper and lower layers 20 and 21 moulded to shape as shown so as to provide three longitudinally extending cylindrical chambers 22 in which the adsorbing material is contained. Between and outside these three chambers are flat surfaces which may be held together by a light coating of wax.

In another method the gas may be evolved by the change of state of a liquid or solid. For instance, carbon dioxide snow may be used. Such material would be inserted into the gas spaces as the cable body is entering the lead press for the application of the sheath. For this purpose a carrier strip, such as shown in Figure 11, 12 or 13 could be used.

A further method which is available is the introduction of the gas into the spaces while the gas is enclosed in a container and the releasing of the enclosure after the sheath has been applied. For instance, the gas under high pressure may be enclosed in a thin pipe such as shown in Figure 14. This pipe 23 which is of a flattened oval section, such as shown in Figure 9, may be made of an alloy having a low melting point and may be divided at intervals into chambers by constrictions as shown at 24. At each of the constricted places a sealing plug 25 may be placed which is of such dimensions that with the part 24 of the pipe it forms a wall of the full width and depth of the space between two adjacent turns of the spacing strip 5 when the tube has been placed in position between these turns, as shown in Figure 9. This pipe is laid in the helical gas space and the sheath is then applied. After this the gas is released by the fusion of this pipe or a part of it, preferably its radially inner wall. This may be done by the use of high resistance wires arranged as shown in Figure 9. In this arrangement a high resistance metal tape or wire 26 is laid longitudinally between the core and the spacing strips 5. It is insulated from the conductive covering 3 of the dielectric by a strip of paper 27 and from the spacing pieces 5 by pieces of paper 28. By the passage of a current for a short time through this heating member 26 each of the gas chambers in the pipe 23 can be opened by the melting of a portion of the wall.

Instead of a pipe of low melting point a thin pipe of non-fusible metal, for instance, steel, can be used with low-melting-point plugs inserted in holes in the pipe wall. An arrangement of this kind is indicated in Figure 15 where a pipe 29, which may have the general form shown in Figure 14, is used. This pipe is made of steel but has a number of apertures on its radially outer surface which are filled with plugs 30 of low melting point material. These plugs may be melted, for instance, by producing from an external source high frequency magnetic fields in the steel wall of the pipe. In an alternative arrangement the plugs may be made of a material which is soluble, either in the compound contained in the cable, or in a liquid contained in the pipe. The materials are so chosen that solution occupies an appreciable time to permit the pipe to be placed in position and enclosed in the sheath before liberation of the gas is effected.

Another form of gas container which may be used is shown in Figures 16 and 17. In this case the container consists of a capsule 31, formed for instance, of glass, and shaped to fit a part of the annular space into which it is to be inserted. The outlet from the capsule is in the form of a capillary tube 32 which is sealed with wax or other similar material which can readily be melted or dissolved to free the outlet after the sheath has been applied.

In a further method the gas may be fed under pressure into the helical space from one or both ends of the cable or from intermediate points. In Figure 18 plugs 33 are fixed in position in apertures in the sheath 6 and serve as feeding points for the compressed gas. When the gas has been forced in the helical space it is sub-divided by the production of a change within the cable. This last stage may be carried by providing excess compound of high viscosity within the cable and heating up the cable temporarily so as to cause this compound to become fluid and to run down to the bottom of each convolution and there form a seal between the space in this convolution and that in the next convolution, as shown at 7 in Figures 2 and 3. It will be understood that this method of sub-division may also be employed in other cases as indicated previously in this descripion.

In an alternative method, in which gas is forced along the cable, the sealing pools 7 may be in position before the gas is forced in. For this case the arrangement indicated in Figure 21 may be employed. Here a tube 34 is laid helically in the gas spaces between the core cover 3, the sheath 6 and the spacing strips 5. This tube is formed by folding over a piece of varnished silk of which the overlapping edges are held together by viscous compound. This tube passes through the sealing pools 7 and its ends are brought out from the cable length. At one end the tube is connected to a source of compressed gas and the gas therefrom is admitted gradually to the tube. When the compressed gas has traversed the length of the cable the end of the cable remote from the source of pressure is sealed up; then, while connection to the source of compressed gas is maintained, heat is applied to the cable beginning at the end which has just been sealed up. The effect of the heat is to melt the compound between the overlapping edges of the tube 34 and cause this tube to open and discharge gas into the gas cushion spaces. This opening of the tube also permits the compound to enter from the pools 7 and thereby cut off the further supply of gas. By moving the point of application of heat continuously from the remote end towards the supply end the tube 34 may be completely opened up and each gas space filled with compressed gas and sealed off in succession.

It will be understood that two or more of the several methods described may be utilized in combination to produce the desired conditions of high pressure in the gas cushion spaces.

While the gas cushions could be arranged for multicore cables in an annular space between the cores and the sheath and the methods and arrangements previously described could be used for forming and filling such spaces with compressed gas, it will in general be preferable to utilize, as previously indicated herein, the spaces between the dielectrics of the several cores. Figures 19 and 20 indicate one way in which short cushion spaces can be provided and gas can be introduced into them under pressure. These figures deal with the case of a 3-core cable in which three lines of gas cushions are provided. The central space between the three cores is closed by a filler 35. The other spaces between the cores are divided up by partitions 36, each line of which is attached to a carrier strip 37. The partitions 36 are shaped to fit between the cores and provide a curved outer surface on which the carrier strip rests so that with cores they make a complete circle on which the sheath 6 fits. The strips 37 with the partitions 36 are laid up with the cores and are held thereto by a binder 38 which consists of a thin tape applied helically with a short pitch. This operation is carried out immediately before the application of the sheath 6. For the introduction of the gas under pressure an arrangement similar to that described in connection with Figure 10 is used. Adsorbing material 16, charged with gas under pressure, is carried by the strip 37 between the partitions 36 and is held thereto by a covering 18 of wax or other material which can be readily removed, for instance, by melting, to permit the evolution of the gas.

It will be seen that in the examples described the compound forms either the principal or an auxiliary part of the means for separating the gas cushions from each other and preventing movement of the gas along the cable. Under normal operating conditions the pressure in adjacent gas cushions will be substantially the same so that the tendency for gas to move longitudinally will be small. When a length of cable is to be opened, for instance when making the joint between it and an adjacent length it is possible to reinforce the sealing action of the compound by cooling the end part of the cable length to an abnormally low temperature. This cooling action will, at the same time, reduce the value of the gas pressure in the region where the opening is to be made. Whether such a procedure is necessary will depend upon all the circumstances of the case, including the value of the pressure normally acting in the gas cushions. The choice of this pressure is a matter to be dealt with in the design
of the cable, taking into consideration the op-
erating conditions and the cost of construction and other relevant matters. A value of 200 lbs. per square inch is considered suitable for many cases where high voltages have to be dealt with.

What I claim as my invention and desire to secure by Letters Patent is:—

1. A method of manufacturing an electric cable, comprising the steps of covering a length of conductor with impregnated laminated solid dielectric material, enclosing said length of covered conductor in a continuous sheath, forming cells within said sheath distributed along the length of cable and providing each cell with walls formed in part by permanently solid material, and in part by said dielectric material, filling said cells with gas of a pressure substantially above atmospheric and sealing off each of said cells from the adjacent cells.

2. A method of manufacturing an electric cable, comprising the steps of covering a length of conductor with impregnated laminated solid dielectric material, enclosing said length of covered conductor in a continuous sheath, forming cells within said sheath distributed along the length of the cable and providing each cell with walls formed in part by permanently solid material and in part by said dielectric material, filling said cells with gas, sealing off each of said cells from the adjacent cells and reducing the volume of said cells and thereby compressing the gas therein.

3. A method of manufacturing an electric cable, comprising the steps of covering a length of conductor with laminated solid dielectric material, loading said material with viscous impregnating compound, enclosing said length of covered conductor in a continuous sheath, forming cells within said sheath distributed along the length of the cable and providing each cell with walls formed in part by permanently solid material and in part by said dielectric material, filling said cells with gas, increasing the volume of compound contained in the cable thereby compressing the gas in said cells and sealing off said cells from each other.

4. A method of manufacturing an electric cable, comprising the steps of covering a length of conductor with impregnated laminated solid dielectric material, enclosing said length of covered conductor in a continuous sheath, forming cells within said sheath distributed along the length of the cable and providing each cell with walls formed in part by permanently solid material and in part by said dielectric material, filling said cells with gas, forcing insulating compound into the cable through the solid dielectric material, thereby filling up part of each cell and increasing the pressure of the gas therein and sealing off each of said cells from the adjacent cells.

5. A method of manufacturing an electric cable, comprising the steps of covering a length of conductor with laminated solid dielectric material, loading said material with viscous impregnating compound at a very low temperature, enclosing said length of covered conductor in a continuous sheath, forming cells within said sheath distributed along the length of the cable and providing each cell with walls formed in part by permanently solid material and in part by said dielectric material, filling said cells with gas, sealing off each of said cells from the adjacent cells, producing a rise of temperature of the impregnating compound thereby causing its expansion and the compression of the gas enclosed in said cells.

6. A method of manufacturing an electric cable, comprising the steps of covering a length of conductor with impregnated laminated solid dielectric material, enclosing said length of covered conductor in a continuous sheath, forming cells within said sheath distributed along the length of the cable and providing each cell with walls formed in part by permanently solid material and in part by said dielectric material, incorporating gas retaining means in the cells, sealing off each of said cells from the adjacent cells and after said sealing has been completed, liberating the gas from the retaining means into the cells thereby raising the pressure therein substantially above atmospheric pressure.

7. A method of manufacturing an electric cable, comprising the steps of covering a length of conductor with laminated solid dielectric material, enclosing said length of covered conductor in a continuous sheath, forming cells within said sheath distributed along the length of the cable and providing each cell with walls formed in part by permanently solid material and in part by dielectric material, loading the dielectric material with insulating compound at a low temperature and charged with gas, sealing off each of said cells from the adjacent cells and raising the temperature of the compound thereby liberating gas into the cells and raising the pressure therein substantially above atmospheric pressure.

8. A method of manufacturing an electric cable, comprising the steps of covering a length of conductors with impregnated laminated solid dielectric material, enclosing said length of covered conductor in a continuous sheath, forming cells within said sheath distributed along the length of the cable and providing each cell with walls formed in part by permanently solid material and in part by said dielectric material, introducing gas under pressure into the said cells while adsorbed to solid material, sealing off each of said cells from the adjacent cells and liberating the adsorbed gas and thereby raising the pressure in said cells substantially above atmospheric pressure.

9. A method of manufacturing an electric cable, comprising the steps of covering a length of conductor with impregnated laminated solid dielectric material, enclosing said length of covered conductor, in a continuous sheath, forming cells within said sheath distributed along the length of the cable and providing each cell with walls formed in part by permanently solid material and in part by said dielectric material, placing within the said cells containers enclosing compressed gas, sealing off each of said cells from the adjacent walls and opening the containers and thereby liberating the gas in said cells.

10. A method of manufacturing an electric cable, comprising the steps of covering a length of conductor with impregnated laminated solid dielectric material, enclosing said length of covered conductor in a continuous sheath, forming between the said sheath and said dielectric material cells distributed along the length of the cable and providing each cell with a wall formed in part by said dielectric material and having each cell in connection with the other cells, charging these cells with gas under pressure by causing it to flow along the cable, through the cells in sequence and sealing off each cell from the adjacent cells.

11. A method of manufacturing an electric cable, comprising the steps of covering a length of conductor with impregnated laminated solid dielectric material, applying a spacing strip in convolutions round said dielectric material, placing bodies of viscous insulating compound in the spaces between the convolutions of the strip, running a tube through the spaces between the convolutions and through the viscous compound, tightly enclosing said length of covered conductor with the spacing strip thereon in a continuous sheath thereby forming cells between the sheath, the dielectric and the spacing strip, each of said cells being sealed off from the adjacent cells by the viscous compound therein, forcing compressed gas through said tube and progressively opening a longitudinal seam in the tube and thereby charging the cells with compressed gas and causing the viscous compound to enter the tube to cut off the flow of gas from cell to cell therethrough.

PERCY DUNSHEATH.